Oct. 21, 1930.  C. T. FISCHER  1,779,119
SAUSAGE AND MEAT MOLD
Filed Dec. 6, 1923
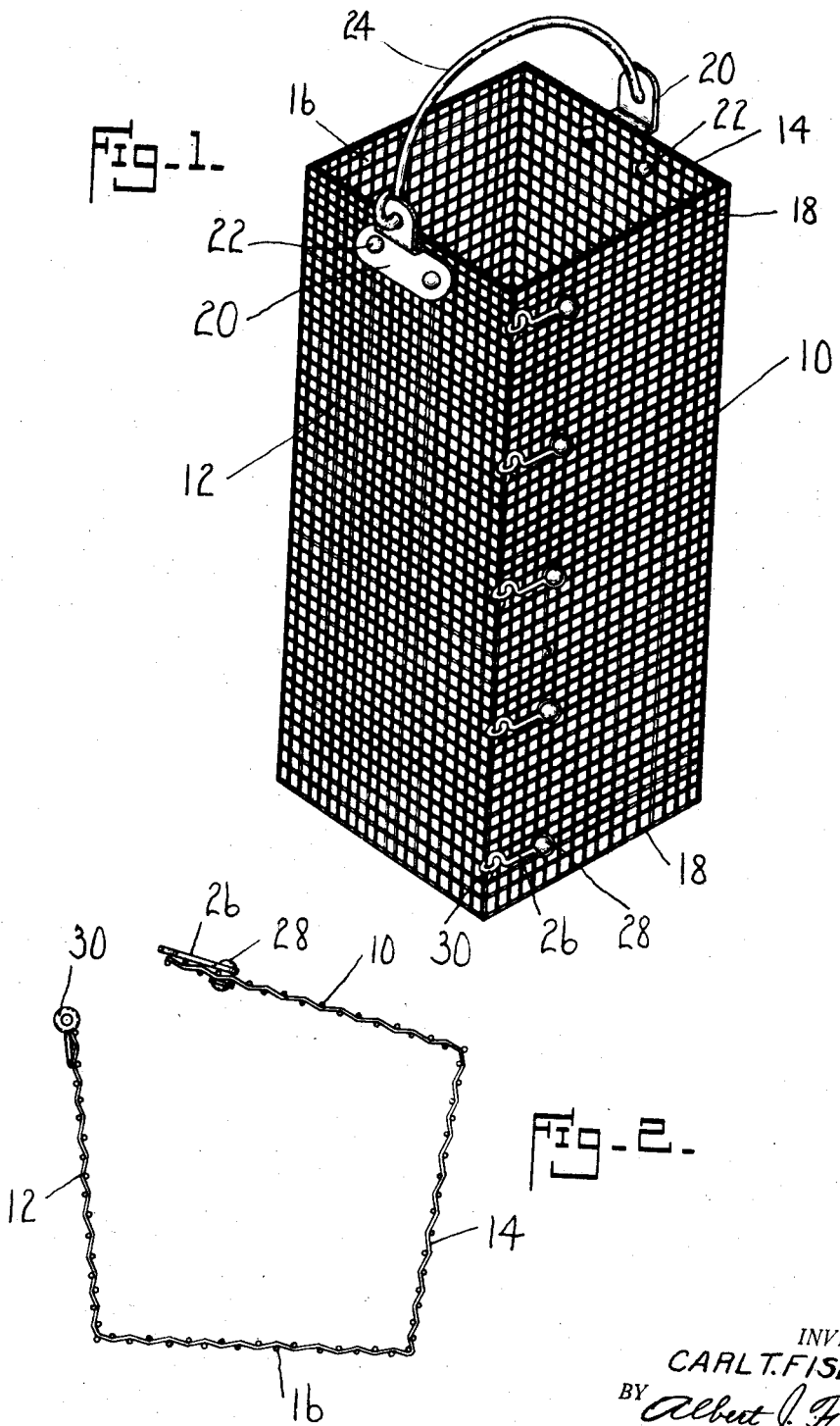
INVENTOR.
CARL T. FISCHER
BY Albert J. Fike
ATTORNEY Patented Oct. 21, 1930

1,779,119

UNITED STATES PATENT OFFICE

CARL T. FISCHER, OF LOUISVILLE, KENTUCKY

SAUSAGE AND MEAT MOLD

Application filed December 6, 1923. Serial No. 678,799.

This invention relates to improvements in sausage and meat molds, or the like, and has for its principal object the provision of means for the retaining, pressing and cooking of hams or the like, whereby the same may be securely and positively retained in a desired shape or form, and which at the same time will allow for the ready penetration of heat, smoke or hot water to the interior of the device and to the meat contained therein.

One of the important objects of this invention is the provision of a mold for meats, which may include boneless hams, various meat loafs, jellied and other preserved meats, such as, sausage stuffed in bladders or the like, which mold will be capable of easy operation, readily cleaned, and which may be adapted to contain various sizes of hams, etc., or various amounts of loaf meat or the like.

Another important object of the invention is to provide a mold for meats or the like, which shall be readily portable, and which will therefore render the shipping or transportation of meat products contained therein especially easy, and without danger of losses from damaged or broken packages, or other similar causes.

Other and further important objects of this invention will be apparent from the description in the accompanying drawings and in the following specification.

The invention, in a preferred form, is illustrated in the drawings, and hereinafter more fully described.

In the drawings:

Figure 1 is a perspective view of the improved meat mold of this invention.

Figure 2 is a horizontal sectional view taken at any point of Figure 1, showing the device in open position.

As shown in the drawings:

The reference numerals 10, 12, 14 and 16 indicate respectively the front and side walls and the rear wall of the improved meat mold, as contemplated by this invention.

As illustrated, the walls are composed of a comparatively heavy wire netting or screen, and it will be obvious that the size of the mesh, the thickness of the wire, and the dimensions of the device may all be varied accordingly as desired or necessary.

The top and bottom edges are provided with reinforcing rods or bars as at 18, and the tops of the side walls 12 and 14 are provided with plates 20 fastened thereto by rivets or the like 22. The plates 20 have upstanding integral projections provided with openings for the curved ends of a handle 24 of wire or rod. This handle 24, it is evident can easily be removed, if necessary.

Hooks 26 or other retaining means are provided on the front member 10, being maintained in operative position by rivets or the like 28. These hooks are adapted to co-operate with suitable loops or eyes 30, as illustrated, the loops 30 being in turn securely fastened to the corresponding points on the side member 12.

It will be noticed that the hinge portion between the front or cover member 10 and the side member 14 is illustrated in the drawings as forming an integral part of the device. However, any other suitable hinge means may be employed, as a rod extending the full height of the frame, and passing through loops formed on the edges of the front and side members. The whole four walls may be joined in this manner, if desired, thereby providing a device which may be fully opened out or laid flat. The hooks 26 and eyes 30 may also be eliminated, and a fastening means introduced which comprises a rod passing through loops, as outlined above.

It will be seen that herein is provided a meat mold which shall be particularly efficient, and readily handled, and which is adapted for the easy and economical pressing, cooking and transportation of any meat or similar product which can be made up in pressed form. Top and bottom pieces may be readily introduced into the structure, if desired.

I am aware that many changes may be made, and numerous details of construction varied throughout a wide range, without departing from the spirit of this invention, and I therefore do not purpose limiting the patent granted hereon, otherwise than as necessitated by the prior art.

I claim as my invention:

In a mold of the class described, a body portion having angularly disposed walls, said body portion opening along a line extending lengthwise thereof, said body portion being constructed to be sprung apart from a corner thereof.

In testimony whereof I affix my signature.

CARL T. FISCHER.